(12) United States Patent
Chi et al.

(10) Patent No.: US 8,780,594 B2
(45) Date of Patent: Jul. 15, 2014

(54) PARALLEL INVERTER DRIVE SYSTEM AND THE APPARATUS AND METHOD FOR SUPPRESSING CIRCULATING CURRENT IN SUCH SYSTEM

(75) Inventors: Chien-Yu Chi, Taoyuan Hsien (TW); Lon-Jay Cheng, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 91 days.

(21) Appl. No.: 13/480,880

(22) Filed: May 25, 2012

(65) Prior Publication Data

US 2013/0063063 A1 Mar. 14, 2013

(30) Foreign Application Priority Data

Sep. 8, 2011 (TW) .............................. 100132455 A (51) Int. Cl.
 *H02M 7/48* (2006.01)
 *H02P 27/08* (2006.01)
 *H02P 6/00* (2006.01)

(52) U.S. Cl.
 CPC ................ *H02P 6/002* (2013.01); *H02P 27/08* (2013.01)
 USPC .......... 363/71; 363/44; 318/400.26; 318/811; 318/503; 318/599

(58) Field of Classification Search
 USPC ......... 318/811, 503, 599, 400.26; 363/41, 42, 363/43, 98, 44, 71
 See application file for complete search history.

(56) References Cited

U.S. PATENT DOCUMENTS

| | | | | |
|---|---|---|---|---|
| 5,811,949 | A | * | 9/1998 | Garces .......................... 318/448 |
| 6,023,417 | A | * | 2/2000 | Hava et al. ...................... 363/41 |
| 2007/0070667 | A1 | * | 3/2007 | Stancu et al. .................. 363/132 |
| 2011/0089876 | A1 | * | 4/2011 | Patel et al. ............... 318/400.33 |

* cited by examiner

*Primary Examiner* — Eduardo Colon Santana
*Assistant Examiner* — Bickey Dhakal
(74) *Attorney, Agent, or Firm* — Kirton McConkie; Evan R. Witt (57) ABSTRACT

Proposed is a parallel inverter drive system including includes a plurality of inverter drives connected in parallel with each other, in which each inverter drive includes a switch; a PWM controller connected to the switch for controlling switching operations of the switch device according to a duty cycle signal; and a circulating current suppressor for collecting current information associated with the current of each inverter drive and a summation current, and generating an index according to the collected current information and the desired circulating current quantity. A zero-sequence voltage is generated for each phase of a three-phase voltage command according to the index and the voltage command and the operating mode of the inverter drive, thereby injecting the zero-sequence voltage into the voltage command with a feed-forward configuration so as to fix the voltage command. The PWM controller can generate the duty cycle signal according to the fixed voltage command.

11 Claims, 8 Drawing Sheets

PARALLEL INVERTER DRIVE SYSTEM AND THE APPARATUS AND METHOD FOR SUPPRESSING CIRCULATING CURRENT IN SUCH SYSTEM

FIELD OF THE INVENTION

The invention is related to a parallel inverter drive system, and more particularly to an apparatus and method for suppressing circulating currents in a parallel inverter drive system.

BACKGROUND OF THE INVENTION

Generally, a motor needs an inverter drive to control the rotor frequency of the motor and regulate the rotation speed of the motor, so as to drive the motor to operate. In order to increase the safety of the motor during the operation period, a parallel inverter drive system has been proposed. The parallel inverter drive system is made up of a plurality of inverter drives with their outputs being connected in parallel with each other, thereby driving the motor. The parallel inverter drive system is different from the conventional inverter drive system in that the parallel inverter drive system is made by substituting the bulky inverter drive with a number of small-volume inverter drives and allowing these small-sized volume inverter drives to output collaboratively for driving motor. The main features of the parallel inverter drive system are focused on modularity and redundancy. The modularity feature means that the controllers for individual inverter drives with small capacity are independent from other inverter drives. Thus, the user can expand or lessen the capacity of the inverter drive system depending on user's demands. The redundancy feature means that in case of malfunction, the damaged inverter drive can be replaced during the operation of the inverter drive system without overhauling the entire system. If the inverter drive system is appropriately designed, the motor can be driven to operate continuously on the condition that the other undamaged inverter drives are operating normally, while the damaged inverter drives are replaced without the need of shutting down the entire system. Nonetheless, as errors are existed among the individual inverter drives in the parallel inverter drive system, the currents of the inverter drives are not outputted to the motor in their entirety. Under this condition, currents are flowing among inverter drives. Such phenomenon is termed a circulating current. The error among the inverter drives that induces the circulating current may be the asynchrony of the pulse-width modulation (PWM) carrier waves, the asynchrony of the voltage commands, the system parameters, or the mismatch of the external reactors.

A contemporary technique for suppressing the circulating current in a parallel inverter drive system is accomplished by the detection of zero-sequence current. Using this technique, the detected zero-sequence current is used to change the duty cycle of the zero-voltage vector to allow the zero-sequence current of the slave inverter drive to be zero (certainly the zero-sequence current of the master inverter drive is also zero under this condition). Therefore, the circulating current is suppressed. Although the technique of changing the duty cycle of the zero-voltage vector by the detected zero-sequence current can suppress the circulating current, such technique has the following drawbacks. First of all, such technique can address the problem that the zero-sequence is not zero. However, the fact that the zero-sequence current is zero does not indicate that the circulating current is zero. Hence, such technique may allow the circulating current to linger even after the zero-sequence current is subdued. Second of all, such technique needs to adjust the duty cycle of the zero-voltage vector in a real-time manner. Hence, the microcontroller unit (MCU) of the controller in the parallel inverter drive system must support the function of dynamically adjusting the duty cycle signal. In this manner, the hardware arrangement of the parallel inverter drive system is constrained, and the cost of the parallel inverter drive system is hard to be controlled. Finally, such technique is feasible on the condition that the parallel inverter drive system is consisted of two inverter drives. If the parallel inverter drive system is consisted of three or more inverter drives, such technique does not disclose the operating mode of achieving circulating current suppression in such parallel inverter drive system.

Figure 1:
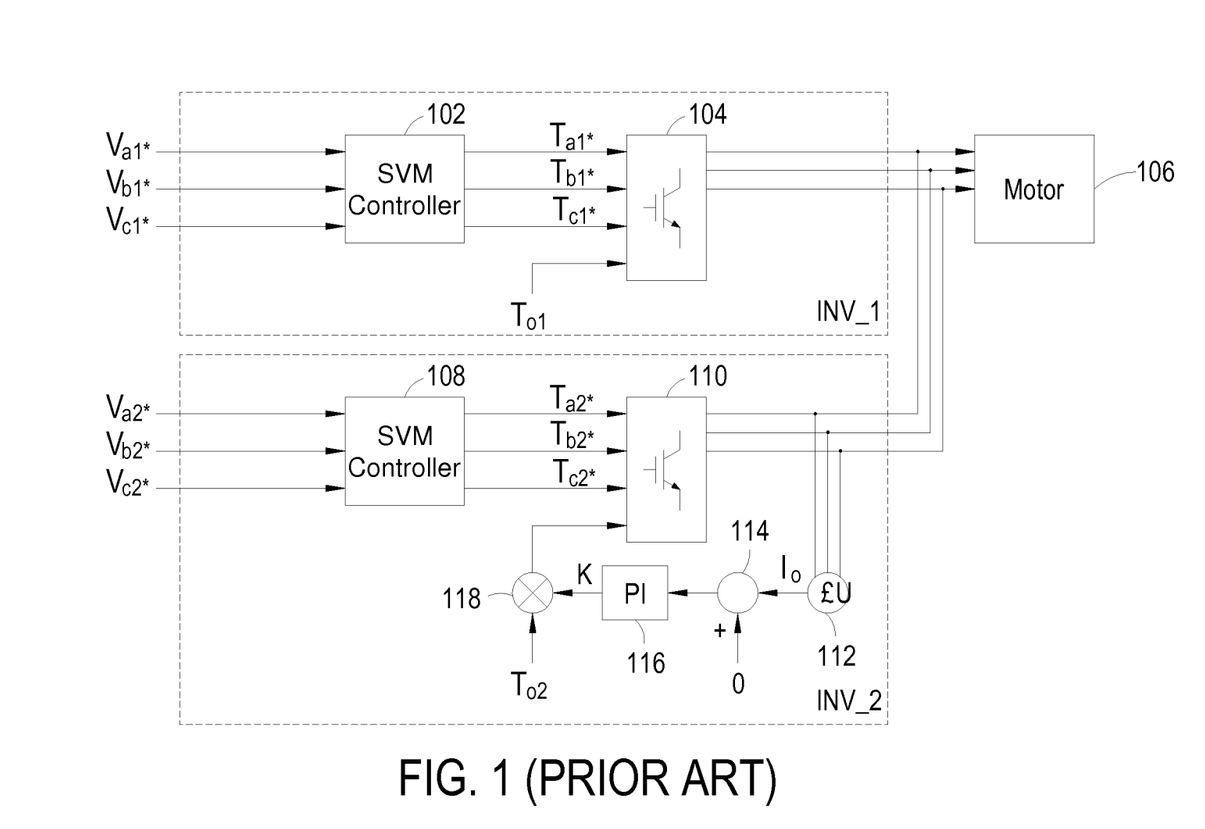
FIG. 1 shows an operative block diagram of a parallel inverter drive system using the circulating current suppression technique with zero-sequence current detection according to the prior art.

Referring to FIG. 1, which is an operative block diagram of a parallel inverter drive system using the circulating current suppression technique with zero-sequence current detection according to the prior art. As shown, the parallel inverter drive system of FIG. 1 includes two parallel-connected inverter drives INV_1 and INV_2, in which the inverter drive INV_1 is a master inverter drive and the inverter drive INV_2 is a slave inverter drive. $V_{a1}^*$, $V_{b1}^*$, $V_{c1}^*$ are the voltage commands inputted into the inverter drive INV_1, and $V_{a2}^*$, $V_{b2}^*$, $V_{c2}^*$ are the voltage commands inputted into the inverter drive INV_2. The master inverter drive INV_1 includes a space-vector modulation (SVM) controller 102 for converting the voltage commands $V_{a1}^*$, $V_{b1}^*$, $V_{c1}^*$ into duty cycle signals $T_{a1}^*$, $T_{b1}^*$, $T_{c1}^*$, and includes a switch device 104 being driven by the duty cycle signals $T_{a1}^*$, $T_{b1}^*$, $T_{c1}^*$ and a duty cycle signal $T_{01}$ with a zero-voltage vector to conduct switching operations. Thus, an AC output voltage and an AC output current are generated to drive the motor 106. Likewise, the slave inverter drive INV_2 includes a space-vector modulation (SVM) controller 108 for converting the voltage commands $V_{a2}^*$, $V_{b2}^*$, $V_{c2}^*$ into duty cycle signals $T_{a2}^*$, $T_{b2}^*$, $T_{c2}^*$, and includes a switch device 110 being driven by the duty cycle signals $T_{a2}^*$, $T_{b2}^*$, $T_{c2}^*$ and a control signal derived by adding a duty cycle signal $T_{02}$ with a zero-voltage vector with an adjustment quantity K to conduct switching operations. Thus, an AC output voltage and an AC output current are generated to drive the motor 106. It is noteworthy that if the duty cycle signal $T_{01}$ with a zero-voltage vector is zero, the space-vector modulation (SVM) controller 102 can be replaced with a sinusoidal pulse-width modulation (SPWM) controller. In this example, the operation of the slave inverter drive INV_2 is adjusted along with the operation of the master inverter drive INV_1. The slave inverter drive INV_2 includes an adder 112 for totaling the feedback currents of the slave inverter drive INV_2 to generate a summation current $I_0$. The summation current $I_0$ is subtracted with a signal with a current value of 0 by subtractor 114, and the output of the subtractor 114 is outputted to a proportional integrator (PI) 116. The proportional integrator 116 is used to convert the summation current $I_0$ into an adjustment quantity K. An operator 118 is used to adjust the duty cycle signal $T_{02}$ with a zero-voltage vector by the adjustment quantity K. The output of the operator 118 is outputted to the switch device 110 to control the switching operations of the switch device 110. Hence, with the adjustment of the summation current $I_0$, the adjustment quantity K represents the dynamic change of the duty cycle signal $T_{02}$ with a zero-voltage vector. It can be understood from FIG. 1 if the system includes a multiplicity of slave inverter drives, the index for calculating the control quantity (i.e. the summation current $I_0$) can not be carried out.

A second solution to suppress the circulating current in a parallel inverter drive system is accomplished by a current sharing method to allow the phase output currents of the inverter drives to be equal with each other. Thus, the current flowing among the inverter drives is suppressed. Using such technique can efficiently balance the output currents of the inverter drives and prohibit the output currents of the parallel-connected inverter drives from interflowing with each other. Such technique is advantageous in that such technique is irrelevant to the space-vector pulse-width modulation (SVPWM), and thus the complicated calculation for generating the duty cycle signal of the zero-voltage vector and the function of dynamically adjusting the duty cycle signal of the zero-voltage vector are not necessary. Nonetheless, such technique still has the following drawbacks. First of all, such technique is antithetical to the aforementioned circulating current suppression technique using the detected zero-sequence current. That is, such technique can not theoretically guarantee that the zero-sequence current is zero even if the output current of the inverter drives are all equal. Second of all, such technique can be applied to a PWM-based control configuration, e.g. such technique can be applied to a sinusoidal pulse-width modulation (SPWM) configuration. However, such technique can not be appropriately linked with the space-vector pulse-width modulation (SVPWM) configuration. However, the inverter drives are generally required to operate under the space-vector pulse-width modulation (SVPWM) mode in practical applications for the purpose of improving voltage utilization. This would cause inconvenience if such technique is applied to the parallel inverter drive system.

Figure 2:
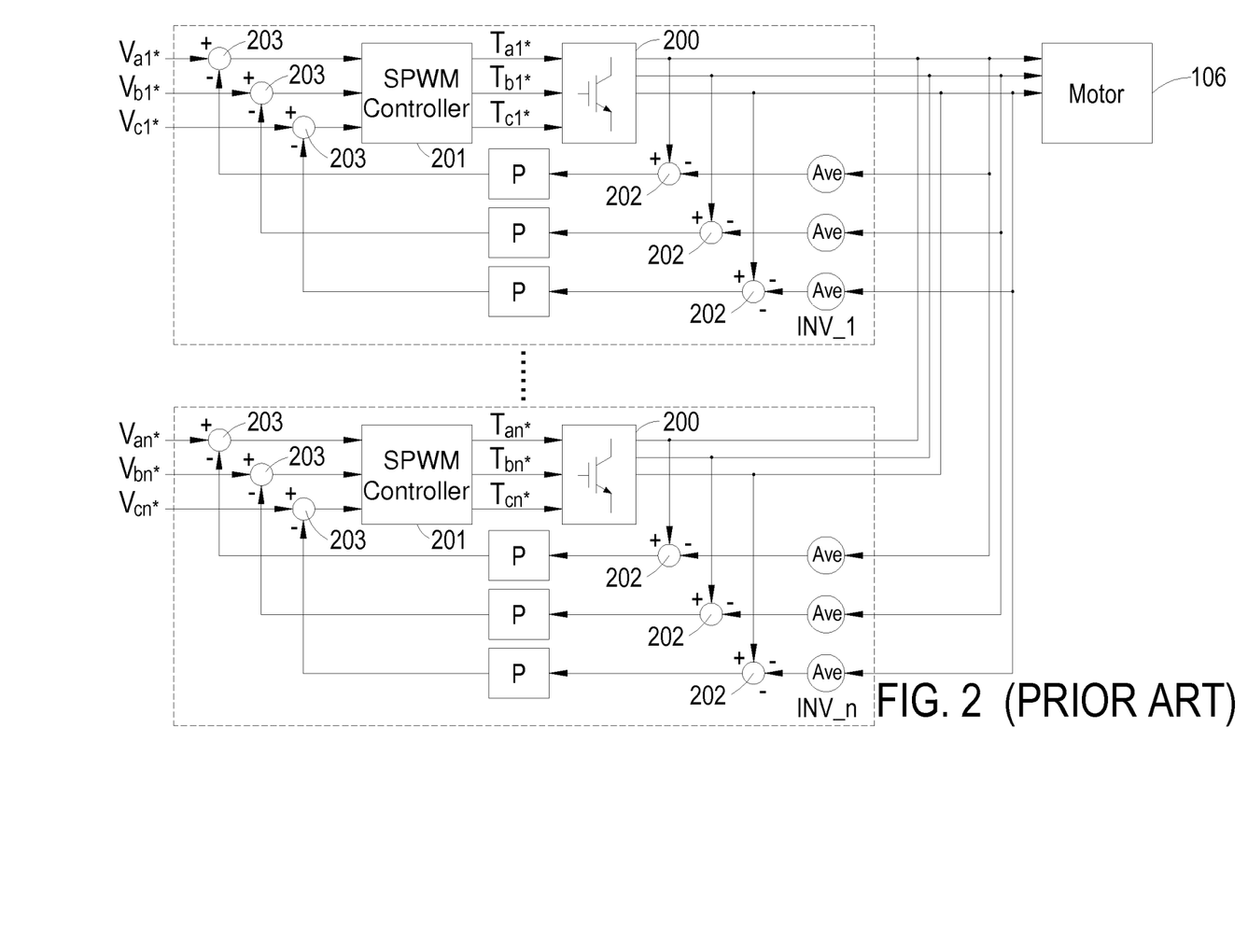
FIG. 2 shows an operative block diagram of a parallel inverter drive system using the circulating current suppression technique with current sharing configuration according to the prior art.

Referring to FIG. 2, which is an operative block diagram of a parallel inverter drive system using the circulating current suppression technique with current sharing configuration according to the prior art. As shown, the parallel inverter drive system for driving a motor 106 is consisted of parallel-connected inverter drives INV_1, . . . , INV_n. Each inverter drive is configured to receive a three-phase voltage command $(V_{a1}^*, V_{b1}^*, V_{c1}^*), \ldots, (V_{an}^*, V_{bn}^*, V_{cn}^*)$. Each inverter drive includes a sinusoidal pulse-width modulation (SPWM) controller 201, and a switch device 200 connected to the sinusoidal pulse-width modulation (SPWM) controller 201. Each inverter drive includes a current averager Ave for obtaining the output currents of other inverter drives and calculating the average current of the output currents of all the inverter drives. The average current calculated by the current averager Ave is transmitted to the operator 202. The operator 202 is configured to compare the output current of the local inverter drive with the average current calculated by the current averager Ave, and in response thereto outputting an error value. A gain controller P is used to calculate a compensating voltage command for compensating the output current according to the error value. The compensating voltage command will be fed back to the sinusoidal pulse-width modulation (SPWM) controller 201, and an operator 203 is used to perform arithmetical operations to the three-phase voltage command $(V_{a1}^*, V_{b1}^*, V_{c1}^*), \ldots, (V_{an}^*, V_{bn}^*, V_{cn}^*)$ and the compensating voltage command, thereby generating a compensated three-phase voltage command. As can be understood from FIG. 2 that the feature of using a current sharing configuration to accomplish the circulating current suppression is that each inverter drive INV_1, . . . , INV_n receives a respective compensated voltage command to force each inverter drives INV_1, . . . , INV_n to have the same phase current with the average current (each phase has different average current to follow). Also, the current sharing configuration of FIG. 2 can be applied to the same control mechanism regardless of the number of the inverter drives. Nevertheless, the generation of the three-phase voltage command is actually accomplished under the sinusoidal pulse-width modulation (SPWM) mode as mentioned above. Also, the respective compensation topology for the phase current can not deal with the problem that the zero-sequence current may exist.

Figure 3:
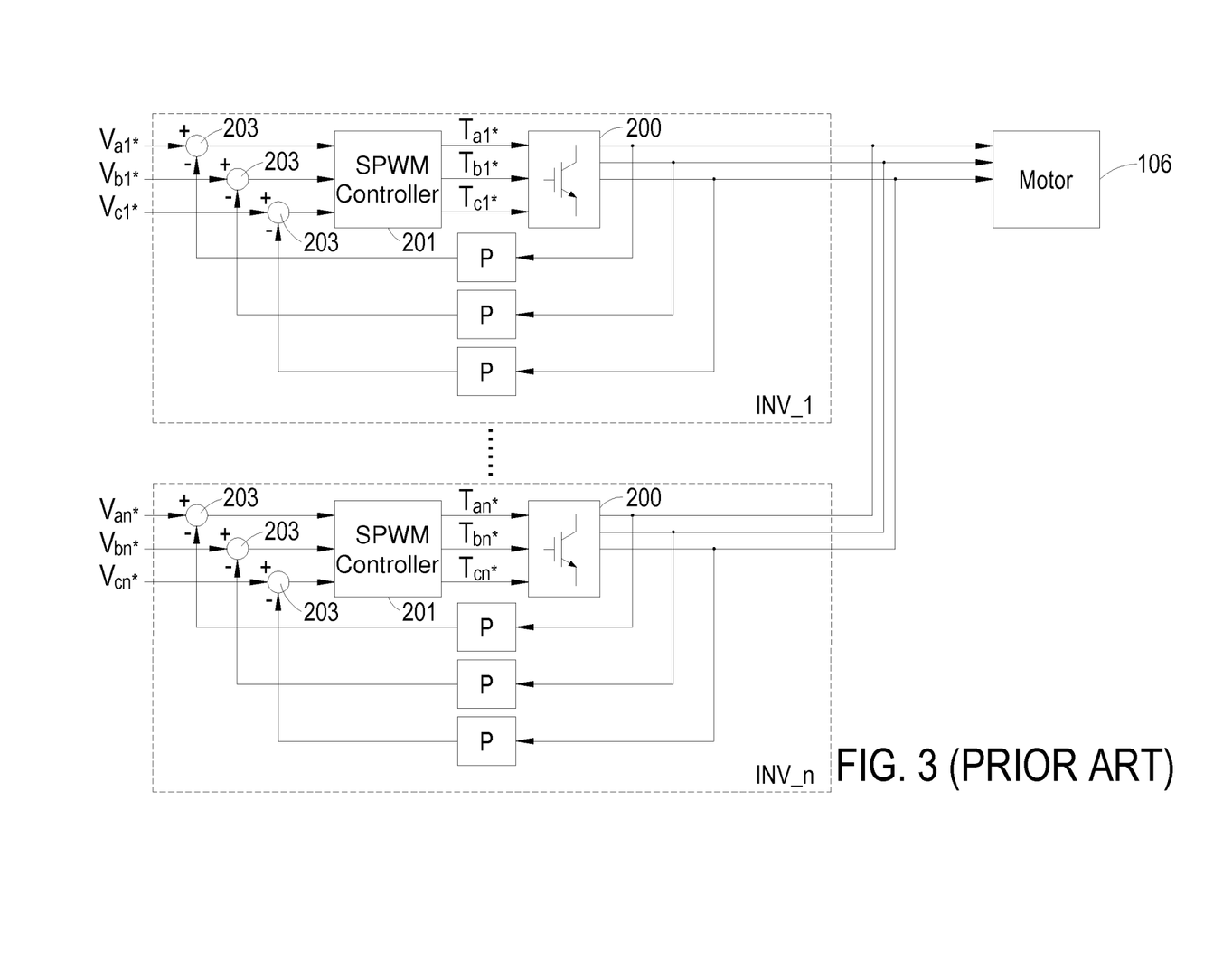
FIG. 3 shows an operative block diagram of a parallel inverter drive system using the circulating current suppression technique with current droop configuration according to the prior art.

The third solution to suppress the circulating current in a parallel inverter drive system is accomplished by a current droop method. Such technique does not require each inverter drive to exchange current information with each other. Instead, such technique requires each inverter drive to compensate its phase current to enhance the modularity of the inverter drive. Referring to FIG. 3, which shows an operative block diagram of a parallel inverter drive system using the circulating current suppression technique with current droop configuration according to the prior art. Compared to the circuit topology of FIG. 2, the circuitry of FIG. 3 does not does not require each inverter drive to exchange current information with each other. Instead, the circuitry of FIG. 3 requires each inverter drive to compensate its phase current. Hence, the output phase current of each inverter drive is provided to the gain controller P for calculating a compensating voltage command for the output phase current. The compensating voltage command is fed back to the sinusoidal pulse-width modulation (SPWM) controller 201. The operator 203 is used to perform arithmetical operations to the three-phase voltage command $(V_{a1}^*, V_{b1}^*, V_{c1}^*), \ldots, (V_{an}^*, V_{bn}^*, V_{cn}^*)$ and the compensating voltage command, thereby generating a compensated three-phase voltage command. Nonetheless, such technique has the following drawbacks. First of all, such technique can result in similar output currents for the inverter drives only on the condition that the each inverter drive INV_1, . . . , INV_n has similar parameters with each other. In other words, the current sharing effects can be attained effectively on the condition that each inverter drive INV_1, . . . , INV_n has the same specification with each other. Second of all, if the method of phase current compensation is used, the compensation quantity will be large if the phase current is large. When the rotation speed of the motor 106 is increasing, a relatively large current will be outputted. Under this condition, if the current droop technique is used, the relatively output current will be subdued. Thus, the transient response will be damped to slow down the acceleration of the rotation speed of the motor. Finally, such technique can simplify the current sharing configuration and attain a better modularity. However, the aforementioned drawbacks are still unresolved.

SUMMARY OF THE INVENTION

A primary object of the invention is to provide a parallel inverter drive system and the apparatus and method for suppressing the circulating current in such system that can suppress the circulating current and the zero-sequence current in the parallel inverter drive system.

Another primary object of the invention is to provide a parallel inverter drive system and the apparatus and method for suppressing the circulating current in such system that can allow the hardware arrangement of the parallel inverter drive system to be more flexible and allow the parallel inverter drive system to be more cost-effective.

Another yet primary object of the invention is to provide a parallel inverter drive system and the apparatus and method for suppressing the circulating current in such system that can be applied to a parallel inverter drive system consisted of three or more inverter drives.

Another yet primary object of the invention is to provide a parallel inverter drive system and the apparatus and method for suppressing the circulating current in such system that can allow the inverter drives in the parallel inverter drive system to adjust their operating modes according to user's demands, thereby diversifying the operations of the inverter drive.

Another yet primary object of the invention is to provide a parallel inverter drive system and the apparatus and method for suppressing the circulating current in such system that can allow the capacity of each inverter drive to be different from with each other.

Another yet primary object of the invention is to provide a parallel inverter drive system and the apparatus and method for suppressing the circulating current in such system that can regulate the circulating current and/or the zero-sequence current and minimize the influence on the transient performance of the parallel inverter drive system.

The major aspect of the invention is to provide a parallel inverter drive system for driving a motor. The inventive parallel inverter drive system includes a plurality of inverter drives connected in parallel with each other. Each inverter drive includes a switch device; a pulse-width modulation controller connected to the switch device for controlling the switching operations of the switch device according to a duty cycle signal; and a circulating current suppressor connected between an output end of the switch device and an input end of the pulse-width modulation controller for collecting current information associated with the current of each inverter drive and the summation current of the inverter drives, and generating an index according to the collected current information and the desired circulating current quantity and/or the desired zero-sequence current quantity in the parallel inverter drive system, and respectively generating a zero-sequence voltage for each phase of a three-voltage voltage command of the inverter drive according to the index, the three-voltage voltage command of the inverter drive, and an operating mode of the inverter drive. Thus, the zero-sequence voltage is injected into each phase of the three-phase voltage command to correct the three-phase voltage command. The pulse-width modulation controller is configured to generate the duty cycle signal according to a corrected three-phase voltage command.

Now the foregoing and other features and advantages of the invention will be best understood through the following descriptions with reference to the accompanying drawings, in which:

DESCRIPTION OF THE PREFERRED EMBODIMENT

An exemplary embodiment embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 4:
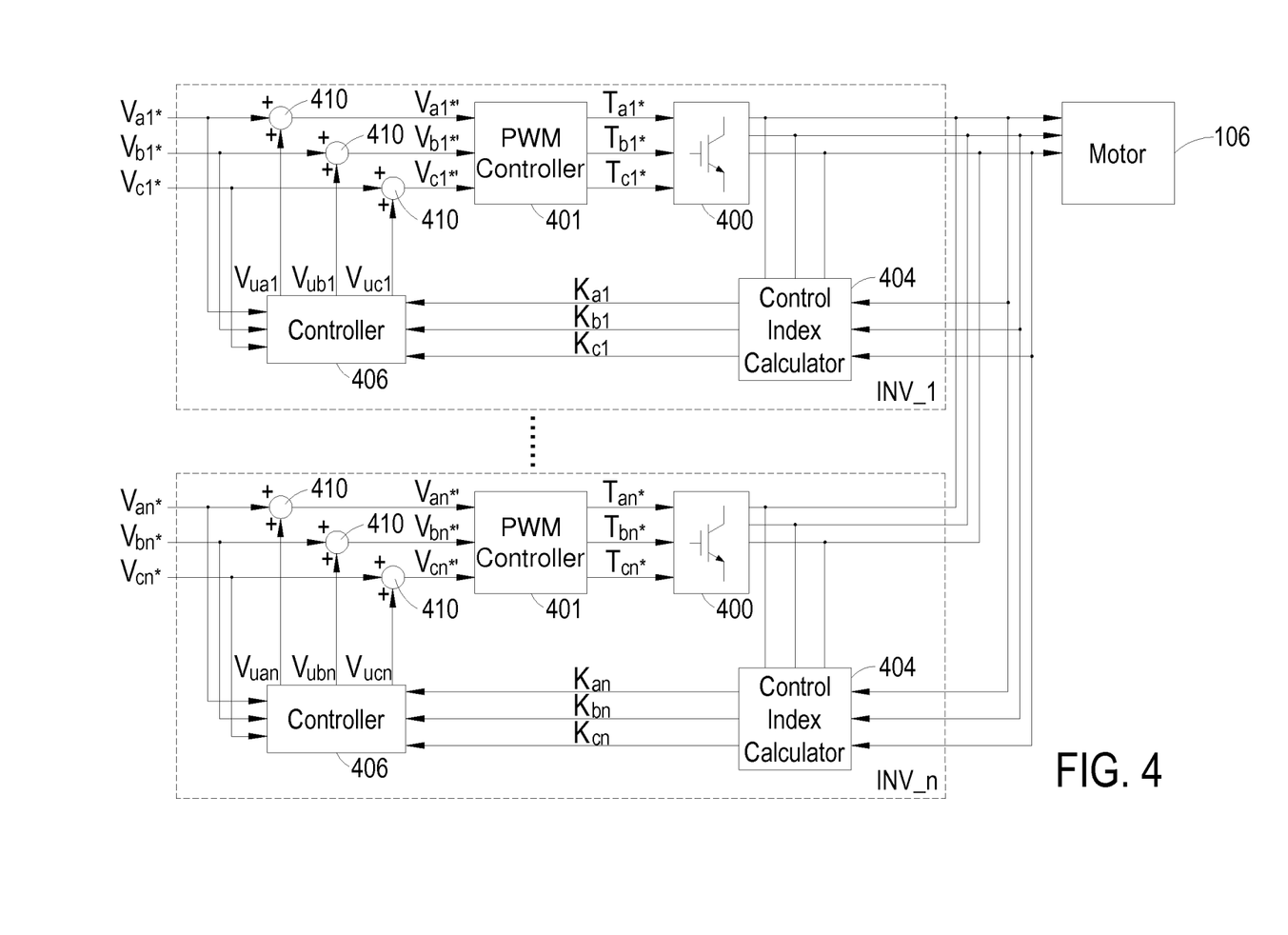
FIG. 4 shows an operative block diagram of a parallel inverter drive system as well as a circulating current suppressing apparatus according to an exemplary embodiment of the invention.

The invention proposes an apparatus and method for suppressing the circulating current in a parallel inverter drive system which is different from the circulating current suppression technique used in the prior art. Referring to FIG. 4, which is an operative block diagram of a parallel inverter drive system as well as a circulating current suppressor according to an exemplary embodiment of the invention. As shown, the parallel inverter drive system including a plurality of inverter drives INV_1, ..., INV_n connected in parallel with each other is used to drive a motor 106. Each inverter drive (INV_1, ..., INV_n) is used to receive a three-phase voltage command $(V_{a1}^*, V_{b1}^*, V_{c1}^*), \ldots, (V_{an}^*, V_{bn}^*, V_{cn}^*)$. Each inverter drive INV_1, ..., INV_n includes a pulse-width modulation (PWM) controller 401, and a switch device 400 connected to the pulse-width modulation (PWM) controller 401. The switch device 400 is configured to conduct switching operations according to a duty cycle signal $(T_{a1}^*, T_{b1}^*, T_{c1}^*), \ldots, (T_{an}^*, T_{bn}^*, T_{cn}^*)$ outputted by the pulse-width modulation (PWM) controller 401. Thus, the three-phase voltage command $(V_{a1}^*, V_{b1}^*, V_{c1}^*), \ldots, (V_{an}^*, V_{bn}^*, V_{cn}^*)$ is converted into an AC voltage and an AC current for driving the motor 106. Each inverter drive INV_1, ..., INV_n further includes a control index calculator 404 for receiving the feedback current of the local inverter drive and collecting the current information of the three-phase current of other inverter drives. Also, the control index calculator 404 can sum up the three-phase current of the local inverter drive and the three-phase currents of other inverter drives. The control index calculator 404 is used to generate a three-phase index $(K_{a1}, K_{b1}, K_{c1}), \ldots, (K_{an}, K_{bn}, K_{cn})$ depending on design requirements according to the feedback current of the local inverter drive and the calculated summation current. Also, each inverter drive INV_1, ..., INV_n further includes a controller 406 for receiving the three-phase index $(K_{a1}, K_{b1}, K_{c1}), \ldots, (K_{an}, K_{bn}, K_{cn})$ and the three-phase voltage $(V_{a1}^*, V_{b1}^*, V_{c1}^*), \ldots, (V_{an}^*, V_{bn}^*, V_{cn}^*)$ for respectively generating a voltage injection quantity (i.e. a zero-sequence voltage) $(V_{ua1}, V_{ub1}, V_{uc1}), \ldots, (V_{uan}, V_{ubn}, V_{ucn})$ associated with the circulating current and/or the zero-sequence current for each phase of the three-phase voltage command, thereby correcting the three-phase voltage command $(V_{a1}^*, V_{b1}^*, V_{c1}^*), \ldots, (V_{an}^*, V_{bn}^*, V_{cn}^*)$ by the voltage injection quantity $(V_{ua1}, V_{ub1}, V_{uc1}), \ldots, (V_{uan}, V_{ubn}, V_{ucn})$ in a feedforward configuration instead of a feedback configuration. In this embodiment, the controller is an unbalanced zero-sequence injection generator (UZSIG). The correction of the three-phase voltage command ($V_{a1}^*$, $V_{b1}^*$, $V_{c1}^*$), ..., ($V_{an}^*$, $V_{bn}^*$, $V_{cn}^*$) is accomplished by adding the original three-phase voltage command ($V_{a1}^*$, $V_{b1}^*$, $V_{c1}^*$), ..., ($V_{an}^*$, $V_{bn}^*$, $V_{cn}^*$) with the voltage injection quantity ($V_{ua1}$, $V_{ub1}$, $V_{uc1}$), ..., ($V_{uan}$, $V_{ubn}$, $V_{ucn}$), thereby generating a corrected three-phase voltage command ($V_{a1}^{*\prime}$, $V_{b1}^{*\prime}$, $V_{c1}^{*\prime}$), ..., ($V_{an}^{*\prime}$, $V_{bn}^{*\prime}$, $V_{cn}^{*\prime}$). The corrected three-phase voltage command ($V_{a1}^{*\prime}$, $V_{b1}^{*\prime}$, $V_{c1}^{*\prime}$), ..., ($V_{an}^{*\prime}$, $V_{bn}^{*\prime}$, $V_{cn}^{*\prime}$) is transmitted to the pulse-width modulation (PWM) controller 401. The pulse-width modulation (PWM) controller 401 is configured to compare the corrected three-phase voltage command ($V_{a1}^{*\prime}$, $V_{b1}^{*\prime}$, $V_{c1}^{*\prime}$), ..., ($V_{an}^{*\prime}$, $V_{bn}^{*\prime}$, $V_{cn}^{*\prime}$) with a triangular carrier wave, and in response thereto generating a duty cycle signal ($T_{a1}^*$, $T_{b1}^*$, $T_{c1}^*$), ..., ($T_{an}^*$, $T_{bn}^*$, $T_{cn}^*$) for controlling the switching operations of the switch device 400. The feedback current of each inverter drive INV_1, ..., INV_n can be measured by the current sensor of the inverter drive. The summation current can be acquired by means of the communications among the inverter drives INV_1, ..., INV_n without the need of additional current sensors.

In this embodiment, the control index calculator 404 can calculate a three-phase index (Ka1, Kb1, Kc1), ..., (Kan, Kbn, Kcn) in accordance with the object to be suppressed, such as the circulating current or/and the zero-sequence current. For example, when the desired circulating current quantity is zero, the output current of the inverter drive INV_1 and the output current of the inverter drive INV_2 should be equal. Therefore, if the difference between the output current of the inverter drive INV_1 and the output current of the inverter drive INV_2 is not zero, it means that the output current of the inverter drive INV_1 and the output current of the inverter drive INV_2 are not equal, then the corresponding three-phase index which is output from the control index calculator 404 of each inverter drive will be adjusted, so as to enable the desired circulating current quantity to be zero. The correction of the three-phase voltage commands can alter the voltage injection quantity using a PWM-based operating mode, such as the sinusoidal pulse-width modulation (SPWM) mode, the space-vector pulse-width modulation (SVPWM) mode, or the digital pulse-width modulation (DPWM) mode, in accordance with the requirements on the operating mode. Hence, the controller 406 can generate different commands in response to different operating modes, and the pulse-width modulation (PWM) controller 401 can be replaced with a sinusoidal pulse-width modulation (SPWM) controller, a space-vector pulse-width modulation (SVPWM) controller, or a digital pulse-width modulation (DPWM) controller. The operation of using the pulse-width modulation (PWM) controller 401 to convert the corrected voltage command into practical input can remove the constraints on the function of the micro-controller unit (not shown) of the pulse-width modulation (PWM) controller 401. That is, the micro-controller unit of the pulse-width modulation (PWM) controller 401 does not need to support the function of dynamically adjusting the duty cycle signal of the switch device 400.

It is noteworthy that the invention employs a feedforward configuration to add the zero-sequence voltage ($V_{ua1}$, $V_{ub1}$, $V_{uc1}$), ..., ($V_{uan}$, $V_{ubn}$, $V_{ucn}$) into the original three-phase voltage command ($V_{a1}^*$, $V_{b1}^*$, $V_{c1}^*$), ..., ($V_{an}^*$, $V_{bn}^*$, $V_{cn}^*$), thereby accomplishing the zero-sequence voltage injection operation to correct the three-phase voltage command. Such technique is analogous to the technique of performing space-vector pulse-width modulation by triangle carrier wave comparison, which is proposed by V. Blasko in 1997. Please refer to V. Blasko, "Analysis of a Hybrid PWM Based on Modified Space-Vector and Triangle-Comparison Methods," IEEE Trans. Industry Applications, Vol. 33, No. 3, pp. 756-764, 1997. Nonetheless, the inventive circulating current suppression technique is different from the technique disclosed in the aforementioned Blasko's article in terms of the following respects: (1) In Blasko, the voltage injection quantity for the three-phase voltage commands are determined by voltage command only; and (2) In Blasko, the voltage injection quantity for the three-phase voltage commands are equal. In order to attain the suppression of the circulating current and/or the zero-sequence current by zero-sequence injection, the invention employs a feedback configuration to calculate a three-phase index and respectively calculate the voltage injection quantity for the three-phase voltage commands in accordance with the three-phase index depending on the requirements on the operating mode. Hence, the inventive circulating current suppression technique will yield different results with the technique disclosed in Blasko's article.

Another aspect of the exemplary embodiment of the invention is concerned with the circulating current suppression method for a parallel inverter drive system. The inventive circulating current suppression method is accomplished by the circulating current suppressor of FIG. 4. The inventive circulating current suppression method is described as follows. First, the control index calculator 404 collects the required current information, including the current of each inverter drive and the summation current of all the inverter drives, and calculates a three-phase index ($K_{a1}$, $K_{b1}$, $K_{c1}$), ..., ($K_{an}$, $K_{bn}$, $K_{cn}$) according to a desired circulating current quantity and/or a desired zero-sequence current quantity. Next, the controller generates a voltage injection quantity associated with the circulating current and/or the zero-sequence current of the parallel inverter drive system according to the three-phase index ($K_{a1}$, $K_{b1}$, $K_{c1}$), ..., ($K_{an}$, $K_{bn}$, $K_{cn}$), the three-voltage voltage command ($V_{a1}^*$, $V_{b1}^*$, $V_{c1}^*$), ..., ($V_{an}^*$, $V_{bn}^*$, $V_{cn}^*$) of the inverter drive, and the operating mode of the inverter drive. Next, the system corrects the three-phase voltage command in a feedforward configuration. Next, the pulse-width modulation controller 401 compares the corrected three-phase voltage command ($V_{a1}^{*\prime}$, $V_{b1}^{*\prime}$, $V_c1^{*\prime}$), ..., ($V_{an}^{*\prime}$, $V_{bn}^{*\prime}$, $V_{cn}^{*\prime}$) with a triangular carrier wave, and in response thereto generating a duty cycle signal ($T_{a1}^*$, $T_{b1}^*$, $T_{c1}^*$), ..., ($T_{an}^*$, $T_{bn}^*$, $T_{cn}^*$) for controlling the switching operations of the switch device 400, thereby driving the motor 106.

Figure 5:
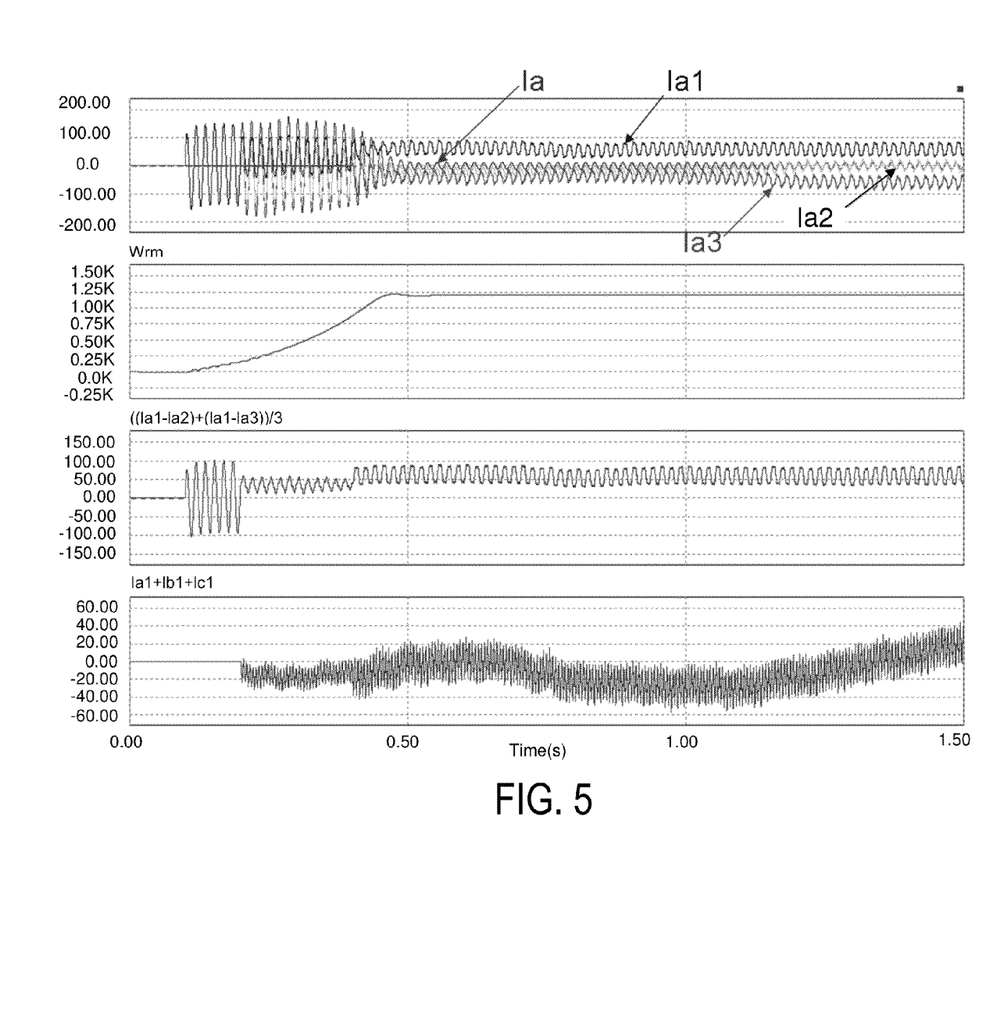
FIG. 5 shows the simulation results of a parallel inverter drive system without using a circulating current suppressor.
Figure 6A:
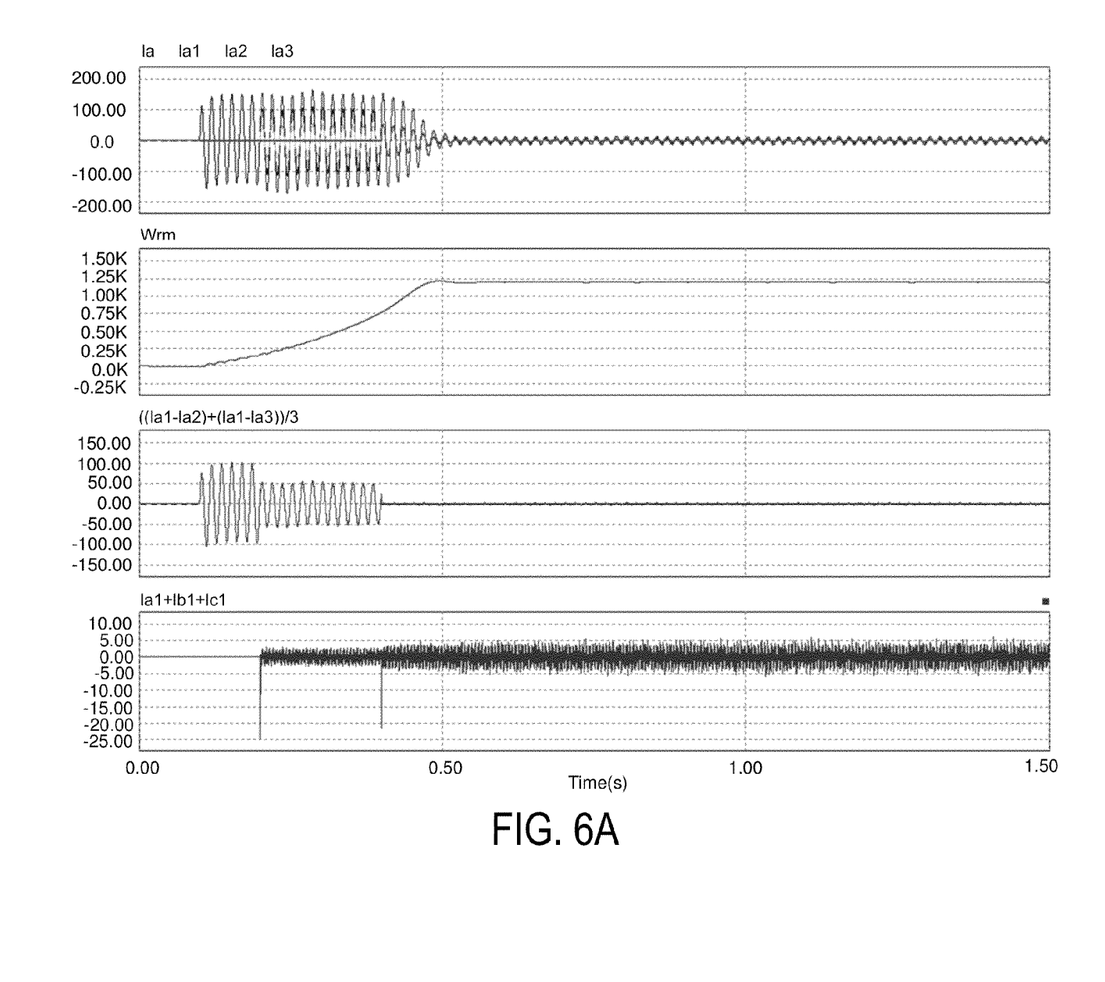
FIG. 6A shows the simulation results of a parallel inverter drive system after the inventive circulating current suppressor is applied thereto for 0-1.5 second.
Figure 6B:
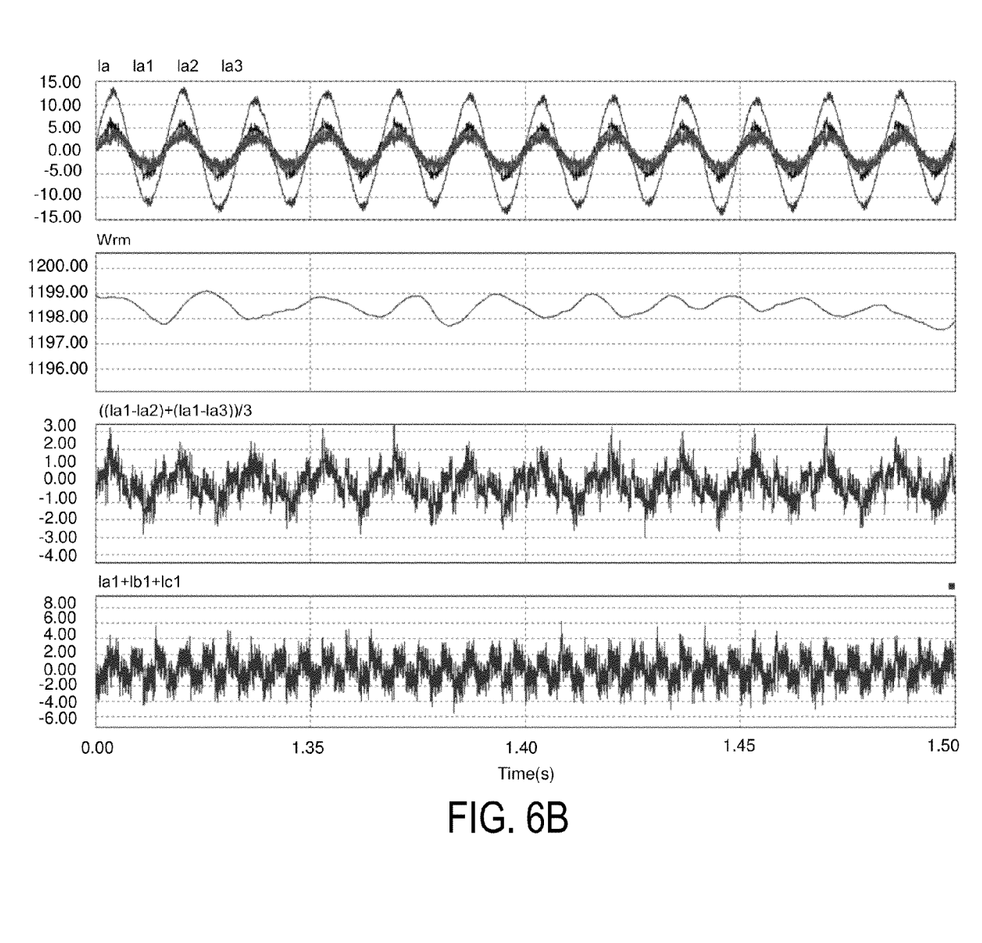
FIG. 6B shows the simulation results of a parallel inverter drive system after the inventive circulating current suppressor is applied thereto for 1.3-1.5 second.
Figure 7:
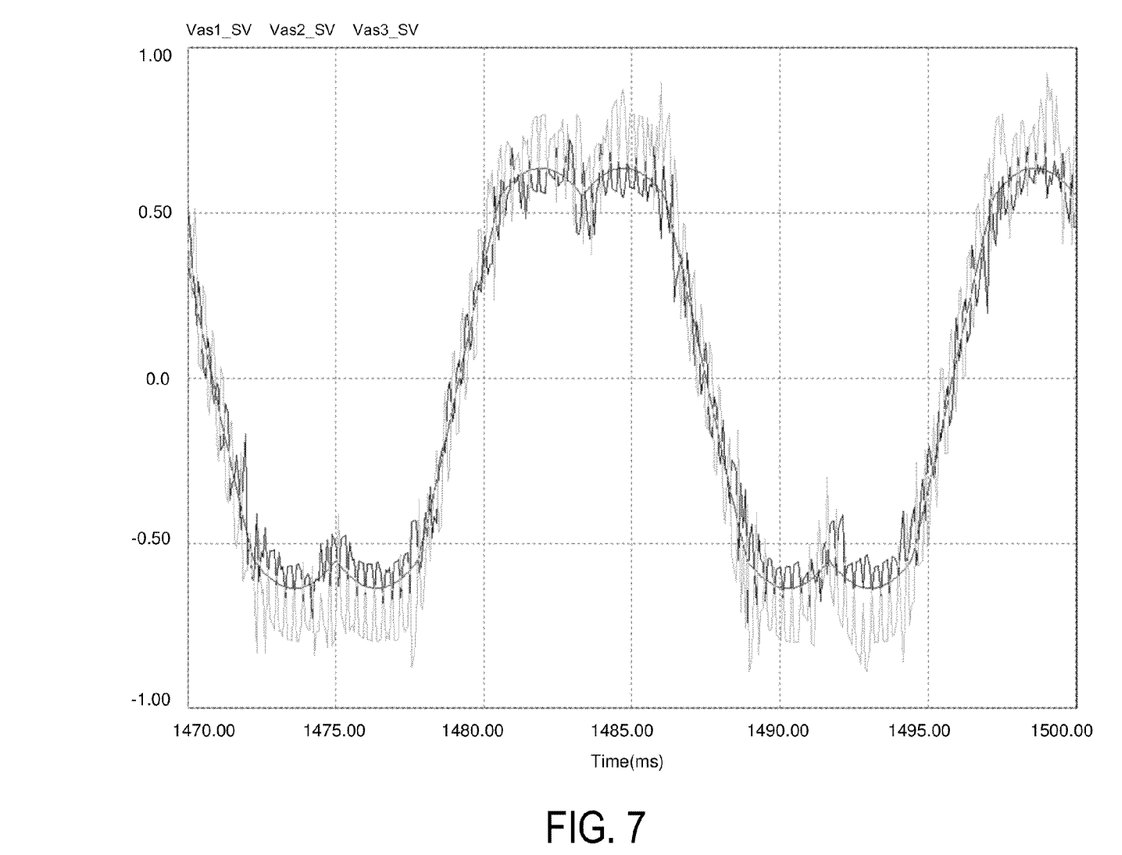
FIG. 7 shows the waveform of the voltage command when the inventive circulating current suppressor is applied to the parallel inverter drive system.

Referring to FIGS. 5, 6A, 6B, and 7, in which FIG. 5 shows the simulation results of a parallel inverter drive system without using a circulating current suppressor, and FIGS. 6A, 6B, and 7 shows the simulation results of a parallel inverter drive system using the inventive circulating current suppressor. In this example, the parallel inverter drive system is consisted of three parallel-connected inverter drives, and the inverter drives are operating under the space-vector pulse-width modulation (SVPWM) mode. Each inverter drive is externally connected with nine reactors all having a reactance of 0.001 H. The operating frequency of each inverter drive is 60 Hz. The phase differences between the voltage commands of the inverter drives are 2.5 degree and 5 degree. The phase differences between the triangular carrier waves of the inverter drives are 10 degree and 20 degree. The first inverter drive is started at the time of 0.1 second. The second inverter drive is started at the time of 0.2 second. The third inverter drive is started at the time of 0.4 second. FIG. 5 shows the outputs of a single phase in the parallel inverter drive system, in which the first picture of FIG. 5 shows the a-phase current of the parallel inverter drive system, which is constituted by the a-phase current of each inverter drive ($I_{a1}, I_{a2}, I_{a3}$), and the a-phase summation current of the inverter drives ($I_a$). The second picture of FIG. 5 shows the rotation speed outputted by the motor 106. The third picture of FIG. 5 shows the circulating current quantity of the parallel inverter drive system. The fourth picture of FIG. 5 shows the zero-sequence current quantity of the parallel inverter drive system. As can be understood from FIG. 5 that when the circulating current suppression technique (or the zero-sequence suppression technique) has not been applied to the parallel inverter drive system, the three-phase currents of the inverter drives will be unstable and the circulating current quantity and the zero-sequence current quantity will continue increasing. As the three inverter drives are connected in parallel with each other, all of three inverters drives manifest the same chaotic results. To simplify the illustration, the simulation results of the other two phases are omitted.

Referring to FIGS. 6A, 6B, and 7, in which FIG. 6A shows the simulation results of a parallel inverter drive system after the inventive circulating current suppressor is applied thereto for 0-1.5 second; FIG. 6B shows the simulation results of a parallel inverter drive system after the inventive circulating current suppressor is applied thereto for 1.3-1.5 second; and FIG. 7 shows the waveform of the voltage command when the inventive circulating current suppressor is applied to the parallel inverter drive system. It is noteworthy that the simulation results of FIG. 5 and the simulation results of FIGS. 6A, 6B, and 7 are derived under the same test conditions. Like the picture arrangement of FIG. 5, the first picture of FIG. 6A and the first picture of FIG. 6B show the a-phase current of each inverter drive ($I_{a1}, I_{a2}, I_{a3}$) and the a-phase summation current of the inverter drives ($I_a$); the second picture of FIG. 6A and the second picture of FIG. 6B show the rotation speed outputted by the motor 106; the third picture of FIG. 6A and the third picture of FIG. 6B show the circulating current quantity of the parallel inverter drive system; and the fourth picture of FIG. 6A and the fourth picture of FIG. 6B show the zero-sequence current quantity of the parallel inverter drive system. As shown in FIG. 6A and FIG. 6B, the a-phase current of each inverter drive are equally distributed in the summation current of the inverter drives. Compared the circulating current quantity and the zero-sequence current quantity shown in FIG. 6A and FIG. 6B where the inventive circulating current suppressor is applied and the circulating current quantity and the zero-sequence current quantity shown in FIG. 5 wherein the circulating current suppression technique is not applied, it can be perceived that the circulating current quantity and the zero-sequence current quantity of the parallel inverter drive system are significantly suppressed when the inventive circulating current suppressor is applied to the parallel inverter drive system. The voltage commands of FIG. 7 are corrected by the controller 406, and the inverter drives are operating under the space-vector pulse-width modulation (SVPWM) mode. In this example, the first inverter drive INV_1 serves as the master inverter drive and the other two inverter drives INV_2 and INV_3 serve as the slave inverter drives. The control commands of the slave inverter drives INV_2 and INV_3 follow the first inverter drive INV_1. It should be stressed that the invention does not limit the operating mode of the inverter drives. If each inverter drive is set to operate under a simplified operating mode, the method of the invention can be applied to all of the three inverter drives. It can be understood from FIG. 7 that the control commands of the master inverter drive INV_1 is injectively adjusted by the controller 406 under the space-vector pulse-width modulation (SVPWM) mode. The control commands of the slave inverter drives INV_2 and INV_3 also need to be injectively adjusted by the controller 406 under the space-vector pulse-width modulation (SVPWM) mode. Furthermore, the slave inverter drives INV_2 and INV_3 also need the three-phase index generated by the control index calculator 404 to adjust their voltage commands for accomplish the suppression of the circulating current and/or the zero-sequence current.

In conclusion, the inventive circulating current suppression technique has the following advantages:

1. The invention does not employ the conventional feedback configuration to correct the voltage commands, but employ the unbalanced zero-sequence injection topology to generate zero-sequence voltages (voltage injection quantity). Thus, the invention can meet the requirements of suppressing the circulating current and suppressing the zero-sequence current.

2. In the parallel inverter drive system using the inventive circulating current suppression technique, the micro-controller unit in the pulse-width modulation controller 401 does not need to support the function of dynamically adjusting the duty cycle signal. Thus, the hardware adaption of the parallel inverter drive system is more flexible and is more cost-effective.

3. The inventive circulating current suppression technique can be extensively applied to a parallel inverter drive system consisted of three or more inverter drives.

4. The inventive circulating current suppression technique allows the inverter drives to adjust their operating modes depending on user's demands. For example, the inventive circulating current suppression technique allows the inverter drives to change their operating modes to the sinusoidal pulse-width modulation (SPWM) mode, the space-vector pulse-width modulation (SVPWM) mode, or the digital pulse-width modulation (DPWM) mode depending on user's demands. Thus, the operations of the inverter drive can be more diversified.

5. As the inventive circulating current suppression technique is applied to a parallel inverter drive system, the capacity of each inverter drive does not need to be the same with each other after appropriate correction.

6. The inventive circulating current suppression technique has little influence on the transient performance of the parallel inverter drive system.

While the invention has been described in terms of what are presently considered to be the most practical and preferred embodiments, it is to be understood that the invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A parallel inverter drive system for driving a motor, comprising:
    a plurality of inverter drives connected in parallel with each other, each inverter drive comprising:
        a switch device;
        a pulse-width modulation controller connected to the switch device for controlling switching operations of the switch device according to a duty cycle signal; and
        a circulating current suppressor connected to an output end of the switch device and an input end of the pulse-width modulation controller for collecting current information associated with a current of each inverter drive and a summation current of the inverter drives, and generating an index according to collected current information and a desired circulating current quantity and/or a desired zero-sequence current quantity, and respectively generating a zero-sequence voltage for each phase of a three-voltage voltage command of the inverter drive according to the index, the three-voltage voltage command of the inverter drive, and an operating mode of the inverter drive, thereby injecting the zero-sequence voltage into each phase of the three-phase voltage command to generate a corrected three-phase voltage command;

wherein the pulse-width modulation controller is configured to generate the duty cycle signal according to the corrected three-phase voltage command.

2. The parallel inverter drive system according to claim 1 wherein the circulating current suppressor includes:

a control index calculator for collecting the current information associated with the current of each inverter drive and the summation current of the inverter drives, and generating an index according to the collected current information and a desired circulating current quantity and/or a desired zero-sequence current quantity;

a controller connected to an output end of the control index calculator for respectively generating a zero-sequence voltage for each phase of the three-voltage voltage command of the inverter drive according to the index, the three-voltage voltage command of the inverter drive, and the operating mode of the inverter drive; and an adder for injecting the zero-sequence voltage into each phase of the three-phase voltage command to generate a corrected three-phase voltage command.

3. The parallel inverter drive system according to claim 1 wherein the pulse-width modulation controller is a sinusoidal pulse-width modulation controller, a space-vector pulse-width modulation controller, or a digital pulse-width modulation controller.

4. The parallel inverter drive system according to claim 1 wherein the pulse-width modulation controller is configured to compare the corrected three-phase voltage command with a triangular carrier wave to generate the duty cycle signal.

5. The parallel inverter drive system according to claim 2 wherein the controller and the adder are arranged in a feedforward configuration to inject the zero-sequence voltage into the three-phase voltage command command.

6. The parallel inverter drive system according to claim 2 wherein the controller is an unbalanced zero-sequence injection generator.

7. A method for suppressing a circulating current in a parallel inverter drive system, wherein the parallel inverter drive system includes a plurality of inverter drives connected in parallel with each other for driving a motor, the method comprising the steps of:

collecting current information associated with associated with a current of each inverter drive and a summation current of the inverter drives;

calculating an index according to collected current information and a desired circulating current quantity and/or a desired zero-sequence current quantity;

generating a voltage injection quantity associated with a circulating current and/or a zero-sequence current of the parallel inverter drive system according to the index, a three-voltage voltage command of the inverter drive, and an operating mode of the inverter drive;

correcting the three-phase voltage command by the voltage injection quantity to generate a corrected three-phase voltage command; and generating a duty cycle signal according to the corrected three-phase voltage command for controlling switching operations of the inverter drive, thereby driving a motor and suppressing a circulating current and/or a zero-sequence current of the parallel inverter drive system.

8. The method for suppressing a circulating current in a parallel inverter drive system according to claim 7 wherein the step of generating a duty cycle signal according to the corrected three-phase voltage command for controlling switching operations of the inverter drive is accomplished by a pulse-width modulation controller.

9. The method for suppressing a circulating current in a parallel inverter drive system according to claim 7 wherein the step of correcting the three-phase voltage command by the voltage injection quantity to generate a corrected three-phase voltage command is accomplished in a feedforward configuration.

10. The method for suppressing a circulating current in a parallel inverter drive system according to claim 7 wherein the step of generating a duty cycle signal according to the corrected three-phase voltage command for controlling switching operations of the inverter drive is accomplished by comparing the corrected three-phase voltage command with a triangular carrier wave.

11. A circulating current suppressor for suppressing a circulating current and/or a zero-sequence current of a parallel inverter drive system, wherein the parallel inverter drive system includes a plurality of inverter drives connected in parallel with each other for driving a motor, the circulating current suppressor comprising:

a control index calculator for collecting current information associated with a current of each inverter drive and a summation current of the inverter drives, and generating an index according to collected current information and a desired circulating current quantity and/or a desired zero-sequence current quantity;

a controller connected to an output end of the control index calculator for respectively generating a zero-sequence voltage for each phase of a three-voltage voltage command of the inverter drive according to the index, the three-voltage voltage command of the inverter drive, and an operating mode of the inverter drive; and an adder for injecting the zero-sequence voltage command into each phase of the three-phase voltage command to generate a corrected three-phase voltage command;

wherein the corrected three-phase voltage command outputted by the adder is converted into a duty cycle signal by the inverter drive, and wherein the duty cycle signal is used to control an output voltage and an output current of the inverter drive, thereby suppressing a circulating current and/or a zero-sequence current in the parallel inverter drive system.

* * * * *